Figure 1:
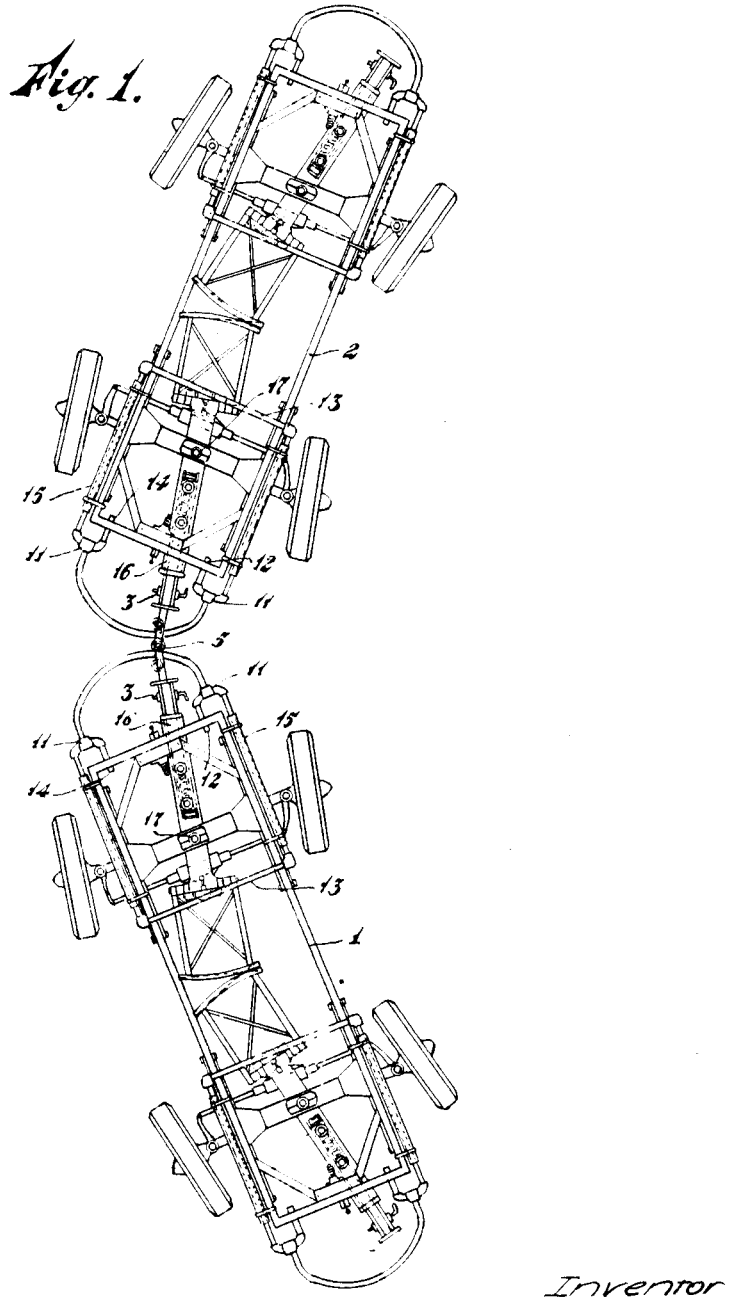

March 10, 1925.

H. W. JONKHOFF 1,529,630

AUTOMATIC STEERING DEVICE FOR COUPLED VEHICLES

Filed June 19, 1923   3 Sheets-Sheet 1

Inventor
H. W. Jonkhoff

March 10, 1925.                                                 1,529,630
              H. W. JONKHOFF
      AUTOMATIC STEERING DEVICE FOR COUPLED VEHICLES
             Filed June 19, 1923      3 Sheets-Sheet 2

Inventor
H. W. Jonkhoff
by Langner, Parry, Card & Langner
Attys

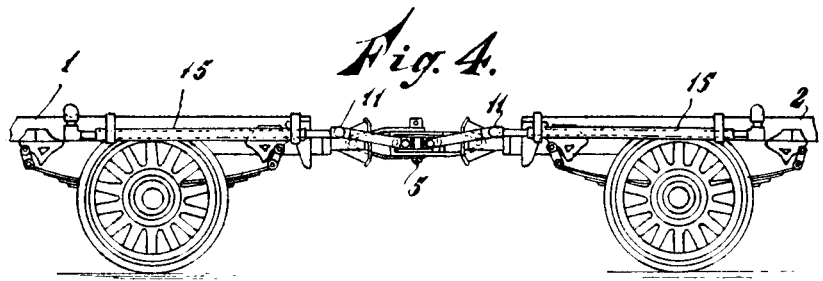
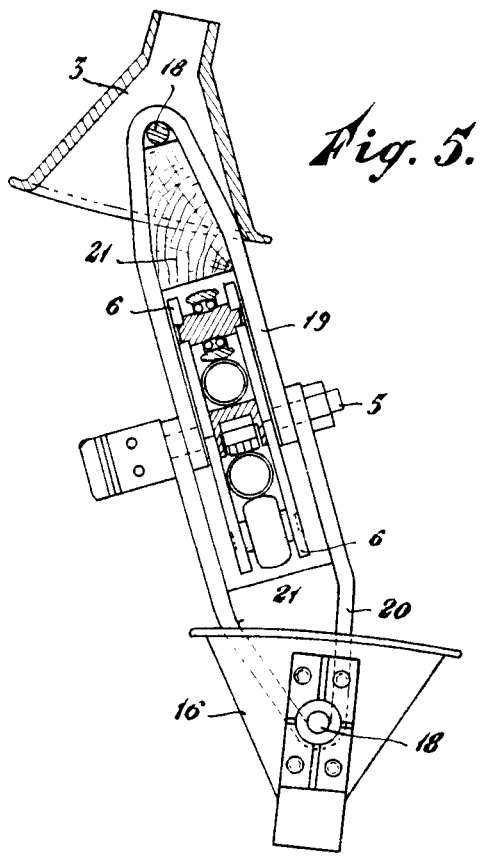

Patented Mar. 10, 1925.

1,529,630

UNITED STATES PATENT OFFICE.

HENRI WOUTER JONKHOFF, OF SEMARANG, JAVA, DUTCH EAST INDIES.

AUTOMATIC STEERING DEVICE FOR COUPLED VEHICLES.

Application filed June 19, 1923. Serial No. 616,423.

*To all whom it may concern:*

Be it known that I, HENRI WOUTER JONKHOFF, a subject of the Queen of the Netherlands, residing at Semarang, Java, Dutch East Indies, have invented certain new and useful Improvements in Automatic Steering Devices for Coupled Vehicles, of which the following is a specification.

As soon as the two steering devices of a trailer are being connected to adjacent vehicles front and back of the same, the lateral forces which are exerted on the front steering buffer are automatically transmitted in opposite sense to the following one, whereby at some speeds oscillations occur. This is not troublesome in other types where only one steering movement acts exclusively on the front wheels the rear buffer being fixed in the longitudinal axis of the vehicle. For in this case the pivotal point in the coupling rod remains always stationary in the longitudinal axis of the preceding vehicle for the reason that the rear buffer thereof does not move. As soon as however this pivotal point in the coupling rod is deprived of its rigidity by making, with double steering, the formerly stationary buffer of the preceding vehicle also movable, then at hour-speeds above 7.5–9.5 kilometers or with a braking or counteraction of the tractor this stability in the steering buffers will be absent for which reason in fast running train formations this double steering up to the present could not be put into practice.

Nevertheless the single steering with longer tractor train formations is unsatisfactory in practice. By reason of the fact namely that the front wheels only are steered a certain cutting off in curves arises for each trailer which is unavoidably increased by each further train. With a double-acting steering device on trailers the action of the front wheels to the one side gives, as already stated, through the connection a reaction of the rear wheels to the other side.

Owing to the unavoidable resiliency in the steering devices giving a retardation in the transmission of the movements at a certain speed, oscillations arise causing undulations in the train formation, which by want of stabilization points increase at each following vehicle.

The construction has namely for its object the fixation of the pivotal points of the various coupling rods in a same arm of a circle when the train without rails moves forwardly in curves. This is obtained by locating tangential points of different arcs of a circle in the same point where they are held by a specially constructed coupling rod e. g. between two trailers. The position of the common tangential point is determined by means of this coupling rod by the direction of both trailer trucks without being dependent on the distance between these trucks mutually, which may vary owing to the buffers being resilient. By constructing namely the coupling rod at the same time as a guiding means for for instance two circularly bent tubes, which are each slidably secured to two oppositely disposed trailer trucks and which therefore are tangential in this coupling rod it is obtained that exclusively the mutual longitudinal direction of both trailer trucks can determine the location of the tangential point.

Such a coupling rod as a guide should, however, not interfere with the other functions of this coupling rod. These functions are for instance based in the first place on a difference in height of the coupled buffers of both vehicles, which arises at unevennesses in the road so that also the vertical shaft in the joint of the coupling rod should be adapted to occupy more or less horizontal positions. By making the tubes sliding in the guiding round and by giving them at either side at a predetermined point parallel to the trailer truck a joint this difficulty can be met with. The guiding is hereby not hindered in its main function for the reason that the round tube can also vertically turn in the round guiding. The tangential point will be brought hereby temporarily at an other height without, however, influencing the steering action of the buffers. By the action of these joints the radius of the arcs of a circle will be broken, the imaginary central point, however, from which these arcs of circle are traced and which will always be located in the direction of the longitudinal axis of the corresponding trailer will move up and down above or below this longitudinal axis.

Secondly the arc of a circle which is traced from the pivot of the buffer by the end of this buffer will be e. g. in the joint of the coupling rod another than that of the tubes which have also their tangential point in this coupling rod or guide, for the reason that the swinging buffers have their pivot in another point in the longitudinal axis of the trailer truck than the imaginary centre from where the arc of a circle of the tubular frame is traced. This difference, however, may be accommodated by making the tubular frame movable in the longitudinal axis of the corresponding trailer truck so that the imaginary centre of these tube-arcs of a circle can shift for accommodation of this difference in the longitudinal axis of the trailer truck, which movability is illustrated on the drawing by a sliding movement. At the same time this sliding movement should serve to make the spring action of the coupled buffers possible as this spring action always causes the lengthening and shortening of the steering buffers so that the trailer trucks are always subjected to forward movement with respect to the tangential point in the coupling rod which movements by virtue of the sliding device can be made without difficulty by the circularly shaped tubes.

Further in curves when traction is exerted the buffer length will increase and with a pressure to the contrary will decrease owing to the spring action in the buffers. Hereby in curves a certain tension will arise in the guiding seeing that through the shortening by pressure the steering action of the buffers, which are held fast at one side in the tangential point, is proportionally increased and that through a lengthening by traction this steering action is to the contrary decreased in proportion to the buffer length. This varying steering action of the buffers, however, cannot transmit itself to the wheels because the joint of the coupling rod is held fast in the tangenial point of the two arcs of a circle, and therefore will be transformed into tension. This tension, however, will just be necessary at those moments by reason of the fact that when a pressure is exerted from the rear side e. g. when descending inclines in curves, a lateral, with regard to the curve outward, pressure is exerted on the point of intersection, which pressure will then be accommodated by the inward tension caused by the relatively increased steering action of the shortened buffers. Correspondingly when traction is exerted from the rear side, for instance when ascending an incline in curves, the inward traction on the tangential point will be accommodated by the outward tension caused by the relatively decreased steering action of the lengthened buffers.

The drawings may illustrate the above with an example so that the practical application of the invention may also appear.

Figure 2:
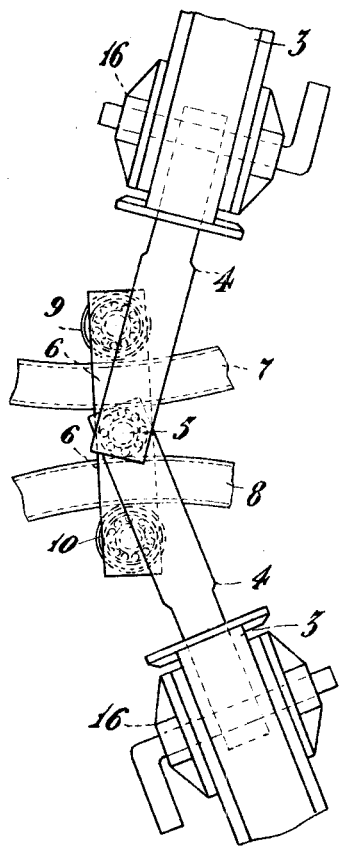

Figure 1 shows a plan view of two trailer trucks 1 and 2 in a curve, both provided with a steering buffer 3 and with connections as already described formerly. The steering buffers are as indicated in Figure 2 interconnected by a pivotal coupling rod 4 the joint 5 of which is held by a guide 6, which is always located in the tangential point of two circularly bent tubes 7 and 8 for the reason that the rollers 9 and 10 as well as the joint 5 have their spindle in the guide 6. The circular tubes 7 and 8 are in Figure 1 at the point 11 hinged to a frame 12, 13, 14 also consisting of a round tube which on its turn is freely slidable in the longitudinal direction of its trailer truck for the reason that it can slide in truck openings at 12 and 14 and further extends longitudinally of the trailer truck through guiding tubes 15 rigidly secured to the said truck, the length of these guiding tubes being such that the tubes have therein at either side at least as much clearance as corresponds to the maximum spring action of the buffers 3 in their buffer sleeves 16.

The centre of the arc of a circle of the tubes is located in a predetermined point in the longitudinal axis of the trailer but when traction is exerted on the buffer it can shift forwardly and when pressure is exerted on the buffer backwardly, but this point remains always located in the longitudinal axis of the trailer. The buffers to the contrary keep their pivot stationary in the point 17 (Figure 1), also disposed in the same longitudinal axis, the radius of their arc 17—5 however, can be varied in length by an internal resiliency of the buffers, so that the pivots 17 in the trailer trucks can remove themselves more or less from the tangential point 5.

As already explained previously the buffer length 17—5 when a pressure is exerted from behind, for instance when descending inclines, will be shortened by the spring action without allowing the tangential point 5, the location of which is determined by the longitudinal direction of the trailers, to shift laterally. In such a case the buffer tends to change its direction as the same difference of direction with shortened buffer must be accommodated by a shorter radius. Consequently a lateral, with respect to the curve inward, pressure will act on the joint 5 which pressure can not realize any result as the joint 5 can not be removed from the tangential point of the circular tube on the guide 6.

As stated an opposite lateral outward force will act at the same time on point 5 as the pressure exerted on point 5 must always come from behind from the direction of the pushing buffer, which pushing force is always outward in curves. Point 5 will withstand these outward forces by means of the inward tension arising from the shortening of the spring buffer, as this inward tension is exerted at two sides (seeing that both buffers are shortened) and increases according as the buffer springs at a higher pressure are more compressed. With traction just the reverse takes place. By the lengthening of the buffers the steering action from the intersecting point 5 on the wheels will decrease which gives rise to a tension in the guide outwardly. When to the contrary the buffer length is increased point 5 will tend to deflect inwardly by the traction exerted in curves so that also here both forces contribute to the stabilization of the intersecting point 5 in the guide 6 under all circumstances.

Figure 3:
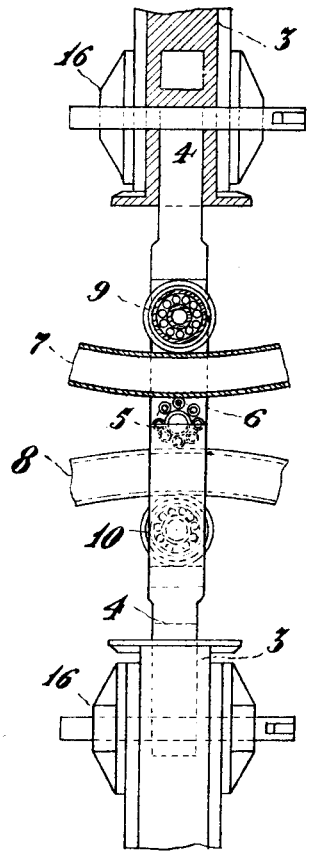

Figure 3 shows again a plan view of the guide 6 located in the longitudinal axis of the coupling rod 4, which position is occupied when the trailer trucks 1 and 2 are in alignment. The tangential point 5 is here also visible, which point consists of a vertical shaft around which on the drawing a roller bearing is arranged serving to receive the eventual pressure exerted by the circular tubes 8 and 7. This roller bearing as well as the ball bearings 9 and 10, keeping the tubes pressed against the roller bearing, has its vertical axis 5 in the guide 6 as appears more clearly from Figure 2.

Figure 4 shows a side elevation of a portion of both trailers and at the same time a section of the tangential point 5 in the coupling rod between both trailer trucks on a smooth ground, whereby the buffers are located at the same level. The vertical shaft 5 thus forms therefore the joint in the coupling rod. The points 11 are the joints in the circular tubes while the dotted line 15 indicates the guiding tube for the tubular frame 12, 13, 14, which guiding tubes are rigidly secured to the trailer truck.

Figure 5 shows by way of example a section of a coupling rod adapted to fulfil the purpose aimed at. The inclined position of the vertical shaft 5 in this embodiment is caused by unequal height positions of the buffers 3 due to unequal height positions of the connected trailer trucks on uneven roads.

The coupling rod is at its ends rotatable about the horizontal coupling pins 18, by means of which it is connected to the buffer mouths 3 and about which pins it can turn vertically. The centre distance of these pins remains therefore always stationary as the buffer mouths belong to the resilient portions of the buffers. In case therefore, due to this buffer spring action, the vertical shaft 5 moves in the direction of one of the trailer trucks then both points 18 will also make this movement. In Figure 5 the two joint-halves of the coupling rod are further denoted by 19 and 20, 20 turning about the outer side of 19. The sections of the circular tubes in the guide are indicated by 8 and 7. The filling 21 serves to fill up the space within the pivotal halves, the inner space leaving space around the pivot for permitting the guide 6 to turn about its shaft 5.

Having now particularly described and ascertained the nature of my said invention, I declare that what I claim is:

1. Automatic steering device for coupled vehicles e. g. four wheel trailers each provided with steering buffers and without common loading surface, characterized by the fact that the buffers are pivotally connected to each other in a point located in the tangential point of two circularly shaped members, each slidably connected to a trailer truck in the longitudinal direction of the latter, the arcs of a circle being traced with constant radius from a centre slidably disposed in the longitudinal axis of each of the trucks, while the said tangential point is, at the same time, when running straight forward the tangential point, or in curves, the intersecting point, of the arcs of a circle traced by the steering buffers from centres also disposed in the longitudinal axes of the trucks but is stationary, the radiuses of these arcs being variable by reason of the spring action of the buffer.

2. Automatic steering device according to claim 1, characterized by the fact that the buffers are connected to each other by a pivotal connecting rod the joint of which is held fast by a guide member always located in the tangential point of the two circularly bent slidable members, the ends of the pivotal connecting rods being connected to the resilient portion of the buffers so that the radiuses of the buffer circle arcs can be varied, while the centres of the circular members having a constant radius are adapted to shift along the longitudinal axes of the trailers without the hereby changed location of the tangential point influencing the steering device.

3. Automatic steering device according to claim 1, characterized by the fact that the circular members are pivoted to the trucks of the trailers about a horizontal axis.

4. Automatic steering device according to claim 1, characterized by the fact that the buffers are connected to each other by a pivotal connecting rod the joint of which is held fast by a guide member always located in the tangential point of the two circularly bent slidable members, the ends of the pivotal connecting rods being connected to the resilient portion of the buffers so that the radiuses of the buffer circle arcs can be varied, while the centres of the circular members having a constant radius are adapted to shift along the longitudinal axes of the trailers without the hereby changed location of the tangential point influencing the steering device, characterized by the fact that the circular members are pivoted to the trucks of the trailers about a horizontal axis.

5. Automatic steering device according to claim 1, characterized by the fact that the circular members each consist of a bent rod pivotally connected at both ends to a rod which is slidable in tubular guides longitudinally secured to the truck.

6. Automatic steering device according to claim 1, characterized by the fact that the buffers are connected to each other by a pivotal connecting rod the joint of which is held fast by a guide member always located in the tangential point of the two circularly bent slidable members, the ends of the pivotal connecting rods being connected to the resilient portion of the buffers so that the radiuses of the buffer circle arcs may be varied, while the centres of the circular members having a constant radius are adapted to shift along the longitudinal axes of the trailers without the hereby changed location of the tangential point influencing the steering device, characterized by the fact that the circular members each consist of a bent rod pivotally connected at both ends to a rod which is slidable in tubular guides longitudinally secured to the truck.

7. Automatic steering device according to claim 1, characterized by the fact that the circular members are pivoted to the trucks of the trailers about a horizontal axis, characterized by the fact that the circular members each consist of a bent rod pivotally connected at both ends to a rod which is slidable in tubular guides longitudinally secured to the truck.

8. Automatic steering device according to claim 1, characterized by the fact that the buffers are connected to each other by a pivotal connecting rod the joint of which is held fast by a guide member always located in the tangential point of the two circularly bent slidable members, the ends of the pivotal connecting rods being connected to the resilient portion of the buffers so that the radiuses of the buffer circle arcs can be varied, while the centres of the circular members having a constant radius are adapted to shift along the longitudinal axes of the trailers without the hereby changed location of the tangential point influencing the steering device, characterized by the fact that the guide member carrying the joint consists of a frame centrally turnable about a vertical pivot and carrying at the ends rollers bearing against circular members passing between these rollers and the vertical pivot, the parts of the connecting rod being on the one hand turnable about the pivot and on the other hand about horizontal coupling pins by means of which they are connected to the resilient portions of the buffers.

In testimony whereof I affix my signature.

HENRI WOUTER JONKHOFF.